United States Patent
Divakaran et al.

(10) Patent No.: US 12,493,693 B2
(45) Date of Patent: Dec. 9, 2025

(54) SYSTEMS AND METHODS FOR SELECTING CLIENT BACKUP FILES FOR MALICIOUSNESS ANALYSIS

(71) Applicant: Acronis International GmbH, Schaffhausen (CH)

(72) Inventors: Dinil Mon Divakaran, Singapore (SG); Candid Wüest, Bassersdorf (CH); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 421 days.

(21) Appl. No.: 18/148,193

(22) Filed: Dec. 29, 2022

(65) Prior Publication Data

US 2024/0220619 A1    Jul. 4, 2024

(51) Int. Cl.
*G06F 21/00* (2013.01)
*G06F 11/14* (2006.01)
(Continued)

(52) U.S. Cl.
CPC ........ *G06F 21/565* (2013.01); *G06F 11/1448* (2013.01); *G06F 21/53* (2013.01);
(Continued)

(58) Field of Classification Search
CPC .... G06F 21/565; G06F 11/1448; G06F 21/53; G06F 21/554; G06F 2201/84;
(Continued)

(56) References Cited

U.S. PATENT DOCUMENTS 9,104,870 B1     8/2015  Qu et al.
12,259,982 B2 *  3/2025  Waldspurger ......... G06F 21/602
(Continued)

FOREIGN PATENT DOCUMENTS

CN    103842965 A    6/2014

OTHER PUBLICATIONS

Dinil Mon Divakaran, Yung Siang Liau, and Vrizlynn LL Thing. "Accurate in-network file-type classification." Proceedings of the Singapore Cyber-Security Conference (SG-CRC), 2016. pp. 139-146.
(Continued)

*Primary Examiner* — Kendall Dolly
(74) *Attorney, Agent, or Firm* — ArentFox Schiff LLP; Michael Fainberg

(57) ABSTRACT

Disclosed herein are systems and methods for selecting files for malware analysis. In one aspect, a method may include identifying, in a cloud network, a backup of a client machine; extracting, from the backup, at least one file of a given file type; determining whether to include the at least one file in a sandbox of the cloud network by performing a static analysis of the at least one file; selecting the at least one file for inclusion in the sandbox based on the static analysis; monitoring, for a period of time, a behavior of the at least one file in the sandbox by performing a dynamic analysis of the at least one file; and in response to determining that the at least one file is malicious based on the dynamic analysis, performing a remediation action on the at least one file.

19 Claims, 4 Drawing Sheets

(51) Int. Cl.
  *G06F 21/53* (2013.01)
  *G06F 21/55* (2013.01)
  *G06F 21/56* (2013.01)
(52) U.S. Cl.
  CPC ........ *G06F 21/554* (2013.01); *G06F 2201/84* (2013.01); *G06F 2221/033* (2013.01)
(58) Field of Classification Search
  CPC ........... G06F 2221/033; G06F 11/3604; G06F 11/3612; G06F 2201/81; G06F 21/566
  See application file for complete search history.

(56) References Cited

U.S. PATENT DOCUMENTS

| | | | | |
|---|---|---|---|---|
| 2011/0154431 | A1* | 6/2011 | Walsh | G06F 21/53 718/1 |
| 2015/0288720 | A1* | 10/2015 | Touboul | G06F 21/51 726/1 |
| 2021/0182397 | A1* | 6/2021 | Karnik | H04W 12/122 |
| 2023/0022044 | A1* | 1/2023 | Lewis | G06F 21/554 |
| 2023/0205880 | A1* | 6/2023 | Ulasen | G06F 21/53 726/23 |

OTHER PUBLICATIONS

R. Khakpour and A. X. Liu, "An Information-theoretical Approach to High-speed Flow Nature Identification," IEEE/ACM Transactions on Networking, 2013. pp. 1-14.

Hendler, Danny, Shay Kels, and Amir Rubin. "Detecting malicious Powershell commands using deep neural networks." In Proc. Asia conference on computer and communications security (ACM ASIACCS), Apr. 14, 2018. pp. 1-19.

Li, Zhenyuan, Qi Alfred Chen, Chunlin Xiong, Yan Chen, Tiantian Zhu, and Hai Yang. "Effective and light-weight deobfuscation and semantic-aware attack detection for Powershell scripts." In Proc. ACM SIGSAC Conference on Computer and Communications Security (CCS), 2019. pp. 1831-1847.

Or-Meir, Ori, Nir Nissim, Yuval Elovici, and Lior Rokach. "Dynamic malware analysis in the modern era—A state of the art survey." ACM Computing Surveys, vol. 52, No. 5, Article 88, Sep. 2019. pp. 1-48.

Shijo, P. V., and A. J. P. C. S. Salim. "Integrated static and dynamic analysis for malware detection." Procedia Computer Science 46, 2015. pp. 804-811.

* cited by examiner

SYSTEMS AND METHODS FOR SELECTING CLIENT BACKUP FILES FOR MALICIOUSNESS ANALYSIS

FIELD OF TECHNOLOGY

The present disclosure relates to the field of data security, and, more specifically, to systems and methods for selecting client backup files for maliciousness analysis.

BACKGROUND

Single users and enterprises both face different kinds of cyber threats today, which are not only increasing in number, but also in sophistication. For example, there are attacks that lie low for weeks or even months in an compromised machine, before springing to action and performing malicious activities such as exfiltration of sensitive/confidential data. This would suggest that client machines should be regularly and frequently analyzed to proactively detect the presence of malware and determine the family the malware belongs to. One approach may be to simply use cloud resources to continuously scan all files on a system. However, cloud resources come with a cost, and therefore this approach is limited because analyzing all files using a cloud system for each client machine of every customer is a tall and impractical task. Processing and memory power are wasted on files that are not malicious, and it may be the case that no infection may be detected over long periods of time. Conducting daily full system scans on a client machine can degrade the performance and user experience of that workload.

SUMMARY

Aspects of the disclosure relate to the field of data security. In particular, aspects of the disclosure describe methods and systems for selecting client backup files, or similar file snapshots, for maliciousness analysis.

In one exemplary aspect, the techniques described herein relate to a method for selecting files for malware analysis, the method including: identifying, in a cloud network, a backup of a client machine; extracting, from the backup, at least one file of a given file type; determining whether to include the at least one file in a sandbox of the cloud network by performing a static analysis of the at least one file, wherein the static analysis includes determining a likelihood of the at least one file being malicious and comparing the likelihood to a threshold likelihood; in response to determining that the likelihood exceeds the threshold likelihood, selecting the at least one file for inclusion in the sandbox, wherein the sandbox is a software environment that isolates the at least one file from other files in the backup; monitoring, for a period of time, a behavior of the at least one file in the sandbox by performing a dynamic analysis of the at least one file, wherein the dynamic analysis includes classifying a given file as malicious or non-malicious; and in response to determining that the at least one file is malicious based on the dynamic analysis, performing a remediation action on the at least one file.

In some aspects, the techniques described herein relate to a method, wherein the remediation action includes one or more of: removing the at least one file from the backup; quarantining the at least one file in the backup; removing the at least one file from the client machine; and quarantining the at least one file in the client machine.

In some aspects, the techniques described herein relate to a method, wherein the given file type is one of a script or an executable, wherein the threshold likelihood is different for each file type.

In some aspects, the techniques described herein relate to a method, wherein determining the likelihood of the at least one file being malicious includes: determining whether one or more rules of a plurality of rules indicate that the at least one file is malicious; and calculating the likelihood based on a weight of the one or more rules.

In some aspects, the techniques described herein relate to a method, wherein the plurality of rules query features present in the at least one file and classify whether the features are associated with potentially-malicious files, wherein the features include whether the at least one file was downloaded from a blacklisted website, whether the at least one file has been modified a threshold number of times in a small period of time, whether the at least one file has changed a system setting, whether a hash value of the at least one file matches a known malware hash.

In some aspects, the techniques described herein relate to a method, wherein determining the likelihood of the at least one file being malicious includes: executing a first machine learning algorithm configured to output a classification of whether the at least one file is to be included in the sandbox and a confidence score of the classification, wherein the confidence score is the likelihood, wherein the first machine learning algorithm is trained to make the classification based on features including opcodes, byte sequences, PE header, and file size of input files.

In some aspects, the techniques described herein relate to a method, wherein classifying the given file as malicious or non-malicious includes executing a malware scanner that compares the at least one file to virus definitions.

In some aspects, the techniques described herein relate to a method, wherein classifying the given file as malicious or non-malicious includes executing a second machine learning algorithm configured to classify the at least one file as malicious or non-malicious, wherein the second machine learning algorithm is trained based on a training dataset including features of labelled files in a plurality of sandboxes.

In some aspects, the techniques described herein relate to a method, wherein in response to determining that the at least one file is not classified as malicious over the period of time based on the dynamic analysis, removing the at least one file from the sandbox.

In some aspects, the techniques described herein relate to a method, wherein in response to determining that the at least one file is not classified as malicious over the period of time based on the dynamic analysis, dissolving the sandbox.

In some aspects, the techniques described herein relate to a method, further including generating a different sandbox for each backup in a backup archive, wherein the different sandbox is dissolved after a predetermined period of time.

In some aspects, the techniques described herein relate to a method, wherein the threshold likelihood is adjusted based on an amount of resources in the cloud network.

In some aspects, the techniques described herein relate to a method, wherein the sandbox includes files originating from backups of a plurality of client machines.

It should be noted that the methods described above may be implemented in a system comprising a hardware processor. Alternatively, the methods may be implemented using computer executable instructions of a non-transitory computer readable medium.

In some aspects, the techniques described herein relate to a system for selecting files for malware analysis, including: a memory; and a hardware processor communicatively coupled with the memory and configured to: identify, in a cloud network, a backup of a client machine; extract, from the backup, at least one file of a given file type; determine whether to include the at least one file in a sandbox of the cloud network by performing a static analysis of the at least one file, wherein the static analysis includes determining a likelihood of the at least one file being malicious and comparing the likelihood to a threshold likelihood; in response to determining that the likelihood exceeds the threshold likelihood, select the at least one file for inclusion in the sandbox, wherein the sandbox is a software environment that isolates the at least one file from other files in the backup; monitor, for a period of time, a behavior of the at least one file in the sandbox by performing a dynamic analysis of the at least one file, wherein the dynamic analysis includes classifying a given file as malicious or non-malicious; and in response to determining that the at least one file is malicious based on the dynamic analysis, perform a remediation action on the at least one file.

In some aspects, the techniques described herein relate to a non-transitory computer readable medium storing thereon computer executable instructions for selecting files for malware analysis, including instructions for: identifying, in a cloud network, a backup of a client machine; extracting, from the backup, at least one file of a given file type; determining whether to include the at least one file in a sandbox of the cloud network by performing a static analysis of the at least one file, wherein the static analysis includes determining a likelihood of the at least one file being malicious and comparing the likelihood to a threshold likelihood; in response to determining that the likelihood exceeds the threshold likelihood, selecting the at least one file for inclusion in the sandbox, wherein the sandbox is a software environment that isolates the at least one file from other files in the backup; monitoring, for a period of time, a behavior of the at least one file in the sandbox by performing a dynamic analysis of the at least one file, wherein the dynamic analysis includes classifying a given file as malicious or non-malicious; and in response to determining that the at least one file is malicious based on the dynamic analysis, performing a remediation action on the at least one file.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for selecting client backup files for maliciousness analysis. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

There exists a need to identify specific files that have the highest likelihood of being connected to malicious activity. One way to achieve this is to carry out dynamic analysis of all executables and scripts found on the client machine. This may involve creating a sophisticated sandbox in the cloud, and then analyzing files within the sandbox to look for malicious activities based on the APIs/DLLs used, the files created, file paths accessed, registry keys accessed, communication made, etc. The sandbox needs to be carefully configured so that the environment appears as real as possible to a malware, otherwise the malware may abort its malicious actions. It should be noted that the sandbox would have to run for long durations before it collects meaningful data indicating malicious intent of the given object. This also means that a large amount of cloud resources will be spent to run the sandbox of such sophistication.

The present disclosure describes designing a system that helps in intelligently selecting a small set of suspicious files using different static analysis techniques, which can then be executed in a sandbox for dynamic analysis. In some aspects, the selection works on backup files of client machines that are hosted/stored in the cloud, and thus does not affect a client machine's performance during the analysis phase.

The system described in the present disclosure uses multiple static analysis techniques such as rules, heuristics, and artificial intelligence (AI) models on backup files of a client machine, to intelligently select files for dynamic analysis in cloud sandboxes (or, in some aspects, customized virtual machines (VMs)). Such static analyses are performed on the backup files hosted in the cloud, thus causing no performance degradation at the client machines. The files selected for dynamic analysis are executed in cloud sandboxes, with the help of AI models. The system further uses configurable thresholds to select the number of files that will be analyzed in the cloud, based on the availability of cloud resources (e.g., CPUs).

Figure 1:
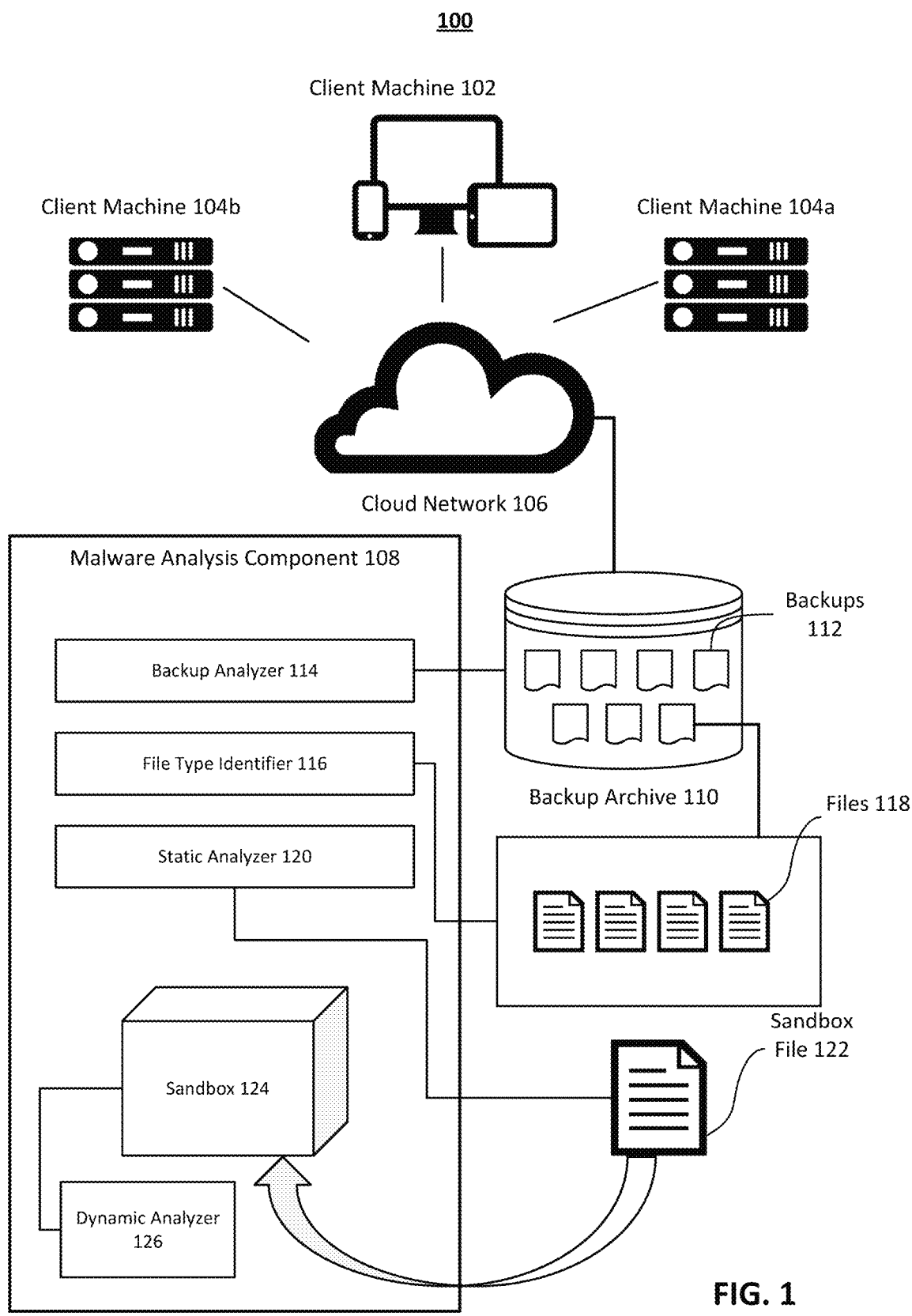
FIG. 1 is a block diagram illustrating a system for selecting client backup files for maliciousness analysis.

FIG. 1 is a block diagram illustrating system 100 for selecting client backup files for maliciousness analysis. System 100 reduces the number of files that need to be run in a cloud sandbox, thus reducing, both, the cost of malware detection as well as time until detection. Furthermore, system 100 operates on backup files of client machines; therefore, there is also no performance degradation that the client machines experience due to the analysis engine.

System 100 includes backup archive 110, which is stored on cloud network 106. Different client machines may upload backups to backup archive 110. For example, backups 112 may be a plurality of backups originating from client machine 102, client machine 104*a*, and client machine 104*b*. These machines may be part of the same organization (e.g., a school, a company, a hospital, etc.). Although only three client machines are shown, one skilled in the art will appreciate that any number of client machines may be a part of an organization. In particular, client machine 102, client machine 104*a*, and client machine 104*b* may be connected to cloud network 106, which includes malware analysis component 108.

Malware analysis component 108 may first identify, using backup analyzer 114, newly created files on a client system (e.g., client machine 102) stored in backup archive 110 since the last backup (e.g., the latest of backups 112) by analyzing changes between multiple backups. Malware analysis component 108 may then identify, using file type identifier 116, the type of the newly created files, using a combination of different techniques, such as the magic number in the initial part of the file, the extension on the file name, inference using an AI model that is trained to classify file types. File type identifier 116 may further filter out all file types except those of interest—leaving files 118 (e.g., executables and scripts). The steps below are expanding on executables and scripts, but can be applied to other file types. The file type identification and static analyses of executables and scripts are carried out in cloud network 106 since they are backup files; this offers the flexibility to run as many algorithms and AI models as required, since static analyses will still be much faster than sandbox-based dynamic analysis.

For a particular file of type T (executable or script), static analyzer 120 of malware analysis component 108 may determine the probability of the file in files 118 being suspicious (or malicious). Static analyzer 120 may execute rules (e.g., to check against known malware hashes). Static analyzer 120 may also include one or more AI models that are trained to detect suspicious contents in file types by extracting numerous features from the files (e.g., opcodes, byte sequences, PE header, file size, etc.) and comparing them against features of known suspicious contents. It should be noted that the AI models of static analyzer 120 may be trained offline using features from both static and dynamic analyses; although at inference (i.e., during the static analysis phase), static analyzer 120 may only use static features (i.e., features obtained without dynamic analysis). During operation/inference, such AI models may also take as input, (i) the hex codes of the files, and (ii) the output of a pre-processing engine that gives more semantic information of the contents.

If the probability of a file of type T (executable or script) being malicious is higher than a pre-defined threshold Or for file type T ($\Theta_{exe}$ and $\Theta_{script}$), then that file (i.e., sandbox file 122) is sent to the cloud sandbox 124 for dynamic analysis, along with other relevant information such as file dependencies, the features used by the AI model to make the inference providing an interpretation/explanation (e.g., the registry key accessed), and the inference result (e.g., the probability of the file being malicious).

It should be noted that, $\Theta_T$, for file type T (executable or script) is a configurable parameter, and the two thresholds for the two file types of interest ($\Theta_{exe}$ and $\Theta_{script}$) are independent. Different thresholds for each file type allows for flexibility when detecting infections because a universal threshold may be effective for a first file type, but not a second file type. In some aspects, each of the thresholds may be adjusted based on the amount of cloud resources available. For example, malware analysis component 108 may increase $\Theta_{exe}$ and $\Theta_{script}$ in response to determining that an amount of cloud resources has decreased (e.g., a sandbox is already running and creating a new sandbox for a subsequent backup with several files is unfeasible because not enough cloud resources are available). A higher threshold reduces the amount of files that will be included in a sandbox, which makes the sandbox easier to run.

In some aspects, sandbox 124 may be any isolated software environment that prevents the spread of infections stemming from files within sandbox 124 to outside of sandbox 124 and client machines 102 and 104*a* and 104*b*. For example, sandbox 124 may be a virtual machine or a container. Sandbox 124 may also be a server with an operating system installed on cloud network 106. Sandbox 124 includes files from a plurality of different client machines. This makes the identification of malicious files more efficient than sandboxes solely including files from a single client machine because fewer sandboxes need to be executed and a larger amount of files can be monitored by a single iteration of cloud resources. The positive impact of using less processing and memory enables for a larger size of client machines to be analyzed.

Using dynamic analyzer 126, malware analysis component 108 may determine that the execution in sandbox 124 reveals that sandbox file 122 is indeed malicious. Dynamic analyzer 126 may be a malware scanner (e.g., an anti-virus software) that monitors activity in sandbox 124 and identifies malicious behavior. For example, sandbox file 122 may be a dormant virus that has been backed up. In sandbox 124, sandbox file 122 may be executed and may activate its malicious behavior (e.g., slowing down the performance of sandbox file 122, corrupting/encrypting other files, etc.). Dynamic analyzer 126 may identify that sandbox file 122 is malicious based on comparing and finding a matching virus definition.

In some aspects, to increase the time and accuracy of detection, dynamic analyzer 126 may execute and deploy AI models. For example, an AI model can be trained on an integrated set of features from static and dynamic analyses (in an offline manner). These features may include the APIs/DLLs used, the files created, file paths accessed, registry keys accessed, communication made, etc. Subsequently, during online operation in sandbox 124, the AI model of dynamic analyzer 126 may take features extracted from static and dynamic analyses for inference. The efficacy of such a model depends on the availability of a large dataset of malware data obtained by executing a plurality of malware samples in sandboxes.

Subsequent to determining that sandbox file 122 is malicious, malware analysis component 108 may execute a remediation action. For example, malware analysis component 108 may mark all backups in backup archive 110 that include sandbox file 122 as unsuitable for recovery. In some aspects, malware analysis component 108 may remove or quarantine sandbox file 122 from backup archive 110 and/or each client machine that includes sandbox file 122. In some aspects, malware analysis component 108 may trigger a threat investigation in which a user manually analyzes quarantined sandbox files. In some aspects, malware analysis component 108 may issue a command for recovery of the latest clean backup from backup archive 110 for client machines that include sandbox file 122.

Not all files in sandbox 124 may end up being malicious (even though static analyzer 120 is configured to minimize this situation). To prevent the waste of cloud resources on non-malicious files in sandbox 124, malware analysis component 108 may remove files from sandbox 124 or dissolve sandbox 124 after a threshold period of time since creation and/or the discovery of a malicious file. Accordingly, if no malicious files are found since the latest discovery of a malicious file or since creation, further resources are not placed in the analysis of sandbox 124. Furthermore, malware analysis component 108 may update rules and AI models in static analyzer 120 to prevent similar files from being placed in future sandboxes. For example, if a rule keeps triggering files to be included in a sandbox, that rule may be modified for removed. Similarly, malware analysis component 108 may re-train the AI models with a modified training dataset that lists the features of the non-malicious files in sandbox 124 as "non-malicious." This feedback loop enables static analyzer 120 to only identify files for inclusion in a sandbox that have the highest probability of being malicious.

Figure 2:
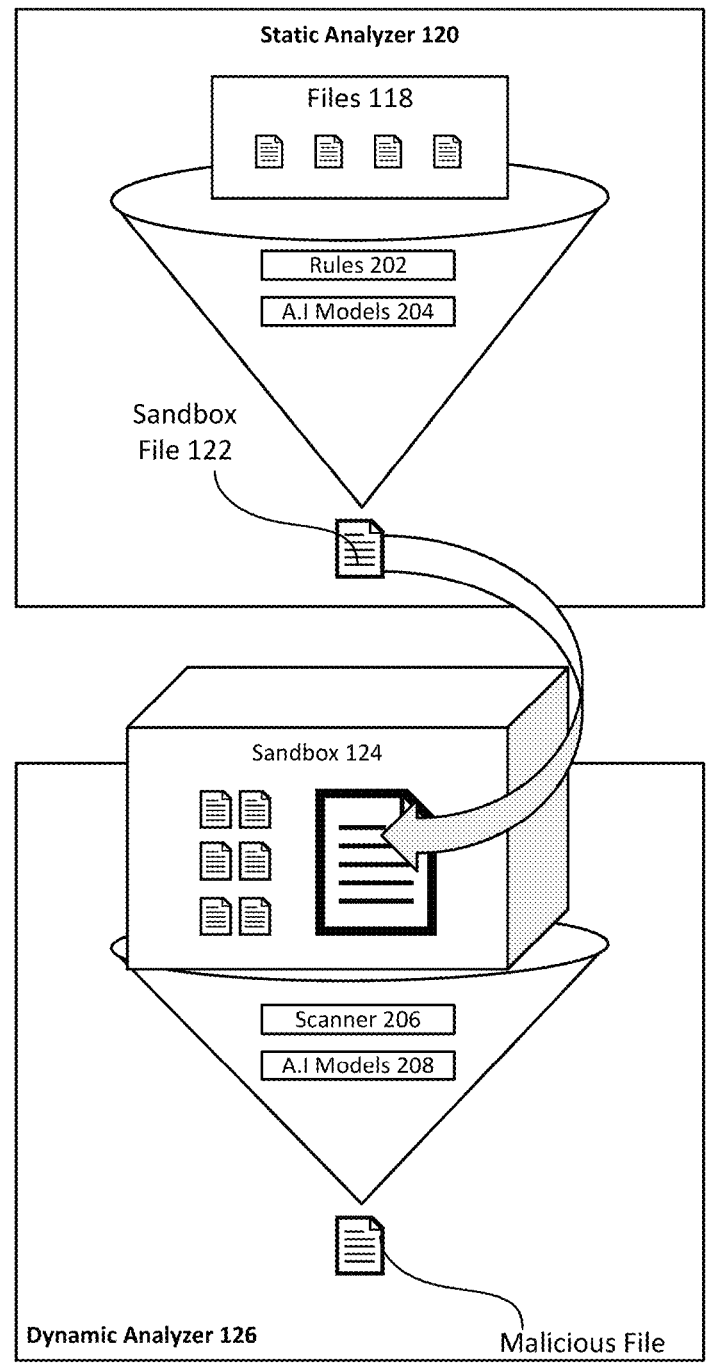
FIG. 2 is a block diagram illustrating attributes of the static analyzer and the dynamic analyzer.

FIG. 2 is a block diagram 200 illustrating attributes of static analyzer 120 and dynamic analyzer 126. Static analyzer 120 receives files 118 and filters them down to the files that should be included in sandbox 124 (i.e., sandbox file 122). Static analyzer 120 includes rules 202 and/or AI models 204. For simplicity, only a single file is shown as sandbox file 122, but multiple files may be identified for inclusion in sandbox 124 by static analyzer 120.

Rules 202 may indicate specific characteristics that, when found in a file, make the file a candidate for inclusion in a sandbox. For example, rules 202 may query whether a file was downloaded from a blacklisted website, whether the file has been modified a threshold number of times in a small period of time, whether the file has changed a system setting, whether a hash value of the file matches known malware hashes, etc. In some aspects, there may a total number (Y) of rules in rules 202. Of rules 202, a given file may trigger a number (X) of rules suggesting that the file should be included in the sandbox. In some aspects, $\Theta_T$ is the fraction X/Y. In some aspects, certain rules may be weighted higher than other rules. For example, if the hash value of the file matches known malware hashes, the file is automatically identified as a file to include in the sandbox (i.e., the corresponding rule is weighted high to ensure that $\Theta_T$ exceeds the threshold scores $\Theta_{exe}$ and/or $\Theta_{script}$). For other rules, such as whether the file has been modified multiple times, the rule may not be weighted as high to prevent false positives. Ideally, system 100 minimizes the amount of files to include in a sandbox, while maximizing the amount of malicious files to include in the sandbox.

AI models 204 may include one or more of machine learning model(s), neural network(s), deep learning model(s), etc. Although AI models is referred to in plural, AI models 204 may be only a single model or an ensemble of models. An AI model may include a machine learning algorithm configured to receive a plurality of features associated with a file and identify the file as being or not being a candidate for inclusion in a sandbox for further analysis. The AI model may be trained with a dataset of static attributes (e.g., file name, size, source, address, opcodes, byte sequences, PE header, etc.) of files that are labelled as "malicious" and "non-malicious." When an arbitrary file is presented to the AI model, the AI model may output a class and a confidence score. This confidence score may represent a likelihood (e.g., a probability) of the file being malicious based on the features. In some aspects, $\Theta_T$ is the confidence score of the AI model.

In some aspects, Or is a function of the fraction of rules that indicate that a file should be included in a sandbox and the confidence score of the AI model. In some aspects, each of these two values is weighted differently depending on user preferences. In some aspects, the weights may be automatically adjusted based on the performance of malware analysis component 108. For example, if the amount of false negatives includes by a threshold amount in a period of time (e.g., 10 false negatives of malicious files missed for inclusion in the sandbox in 1 week), and the confidence score is weighted higher despite the fraction of rules indicating that the corresponding files of the 10 false negatives should be included in the sandbox, the fraction of rules may be weighted higher. Another example metric is the false positive rate; if the number of false positives is significantly higher than a threshold number of false positives, the threshold number may be adjusted (e.g., increased) to improve efficiency.

Subsequent to identifying sandbox file 122, dynamic analyzer 126 is used to monitor sandbox 124, which includes sandbox file 122. Dynamic analyzer 126 may include scanner 206 and/or AI models 208. Scanner 206 may be an anti-virus scanning component that scans files in sandbox 124, whereas AI models 208 may be configured to identify malicious files based on a training dataset that includes features of files previously placed in a sandbox (where each training file is tagged as "malicious" or "non-malicious"). Unlike AI models 204, AI models 208 are trained using data from files placed in a sandbox.

Figure 3:
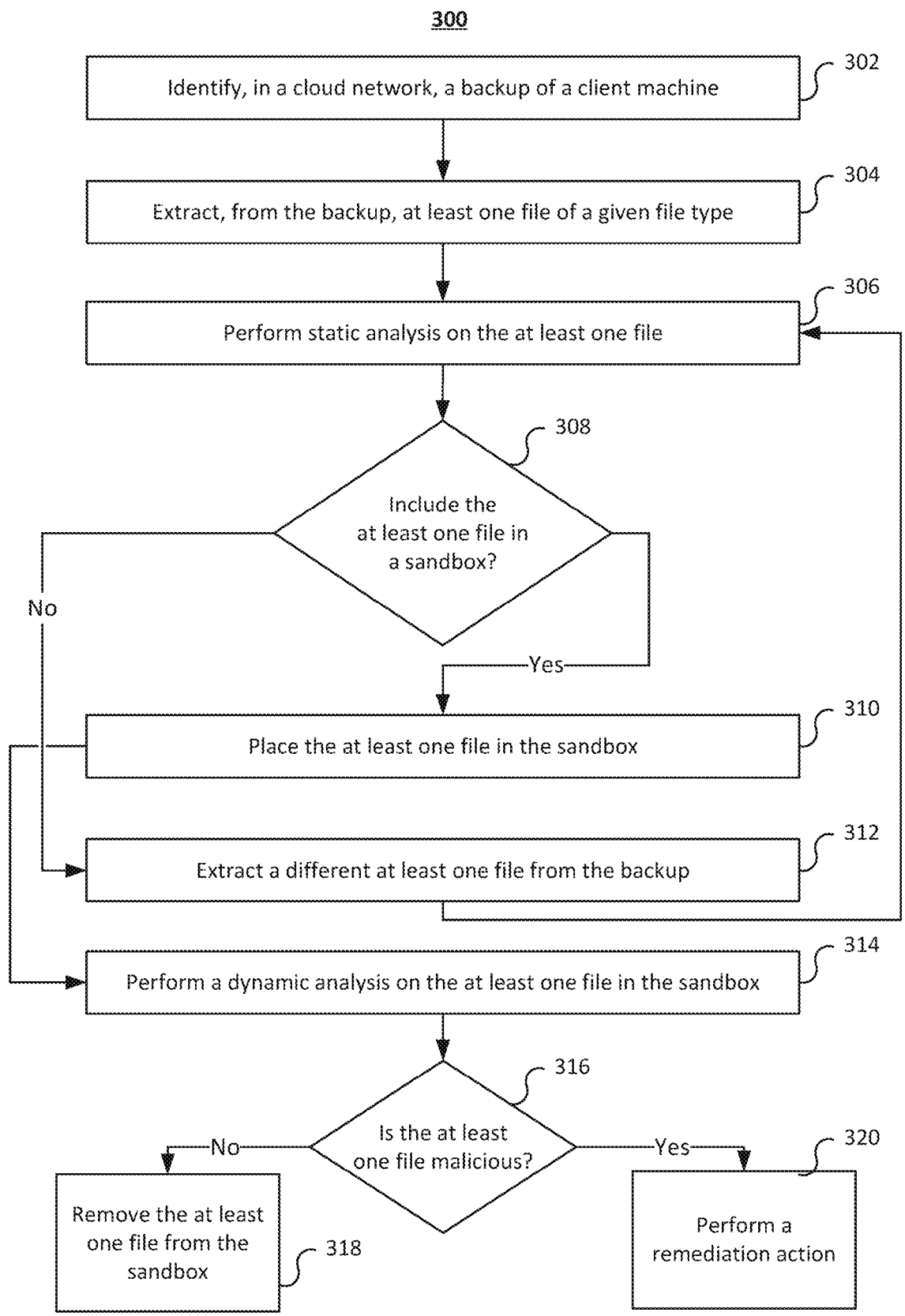
FIG. 3 illustrates a flow diagram of a method for selecting client backup files for maliciousness analysis.

FIG. 3 illustrates a flow diagram of method 300 for selecting client backup files for maliciousness analysis. At 302, malware analysis component 108 identifies, in cloud network 106, a backup of client machine 102 (e.g., of backups 112 in backup archive 110). At 304, malware analysis component 108 extracts, from the backup, at least one file of a given file type (e.g., files 118). In some aspects, the given file type is one of a script and an executable.

At 306, malware analysis component 108 performs a static analysis of the at least one file. The static analysis is used to determine whether to include the at least one file in sandbox 124 of cloud network 106. Sandbox 124 is a software environment that isolates the at least one file from other files in the backup. In some aspects, sandbox 124 includes files originating from backups of a plurality of client machines.

The static analysis involves determining a likelihood of the at least one file being malicious and comparing the likelihood to a threshold likelihood. In some aspects, the threshold likelihood is adjusted by malware analysis component 108 based on an amount of resources in cloud network. In some aspects, malware analysis component 108 may determine the likelihood of the at least one file being malicious by determining whether one or more rules of a plurality of rules 202 indicate that the at least one file is malicious, and calculating the likelihood based on a weight of the one or more rules. The plurality of rules 202 query features present in the at least one file and classify whether the features are associated with potentially-malicious files. The features include whether the at least one file was downloaded from a blacklisted website, whether the at least one file has been modified a threshold number of times in a small period of time, whether the at least one file has changed a system setting, and whether a hash value of the at least one file matches a known malware hash.

In some aspects, malware analysis component 108 may determine the likelihood of the at least one file being malicious by executing a first machine learning algorithm (e.g., of AI models 204) configured to output a classification of whether the at least one file is to be included in sandbox 124 and a confidence score of the classification. This confidence score is the likelihood. The first machine learning algorithm is trained to make the classification based on features including opcodes, byte sequences, PE header, and file size of input files.

In response to determining, at 308, that the likelihood exceeds the threshold likelihood, at 310, malware analysis component 108 places the at least one file in sandbox 124. However, based on the static analysis, if malware analysis component 108 determines that the at least one file is not to be included in sandbox 124, malware analysis component 108 extracts a different at least one file from the backup or a different backup at 312 and returns to 306.

At 314, malware analysis component 108 performs a dynamic analysis on the at least one file (e.g., sandbox file 122) by monitoring, for a period of time, a behavior of the at least one file. The dynamic analysis involves classifying a given file as malicious or non-malicious and in some aspects involves executing a malware scanner 206 that compares the at least one file to virus definitions.

In other aspects, malware analysis component 108 classifies the given file as malicious or non-malicious by executing a second machine learning algorithm (e.g., AI model 208) configured to classify the at least one file as malicious or non-malicious. The second machine learning algorithm is trained based on a training dataset comprising features of labelled files in a plurality of sandboxes.

In response to determining, at 316, that the at least one file is malicious based on the dynamic analysis, at 320, malware analysis component 108 performs a remediation action on the at least one file. In some aspects, the remediation action involves one or more of: removing the at least one file from the backup, quarantining the at least one file in the backup, removing the at least one file from the client machine, and quarantining the at least one file in the client machine.

However, in response to determining that the at least one file is not malicious based on the dynamic analysis, at 318, malware analysis component 108 removes the at least one file from sandbox 124 after a period of time. In some aspects, malware analysis component 108 may also dissolving the sandbox. In general, malware analysis component 108 may generate a different sandbox for each backup in a backup archive. Each different sandbox may be dissolved after a predetermined period of time.

Figure 4:
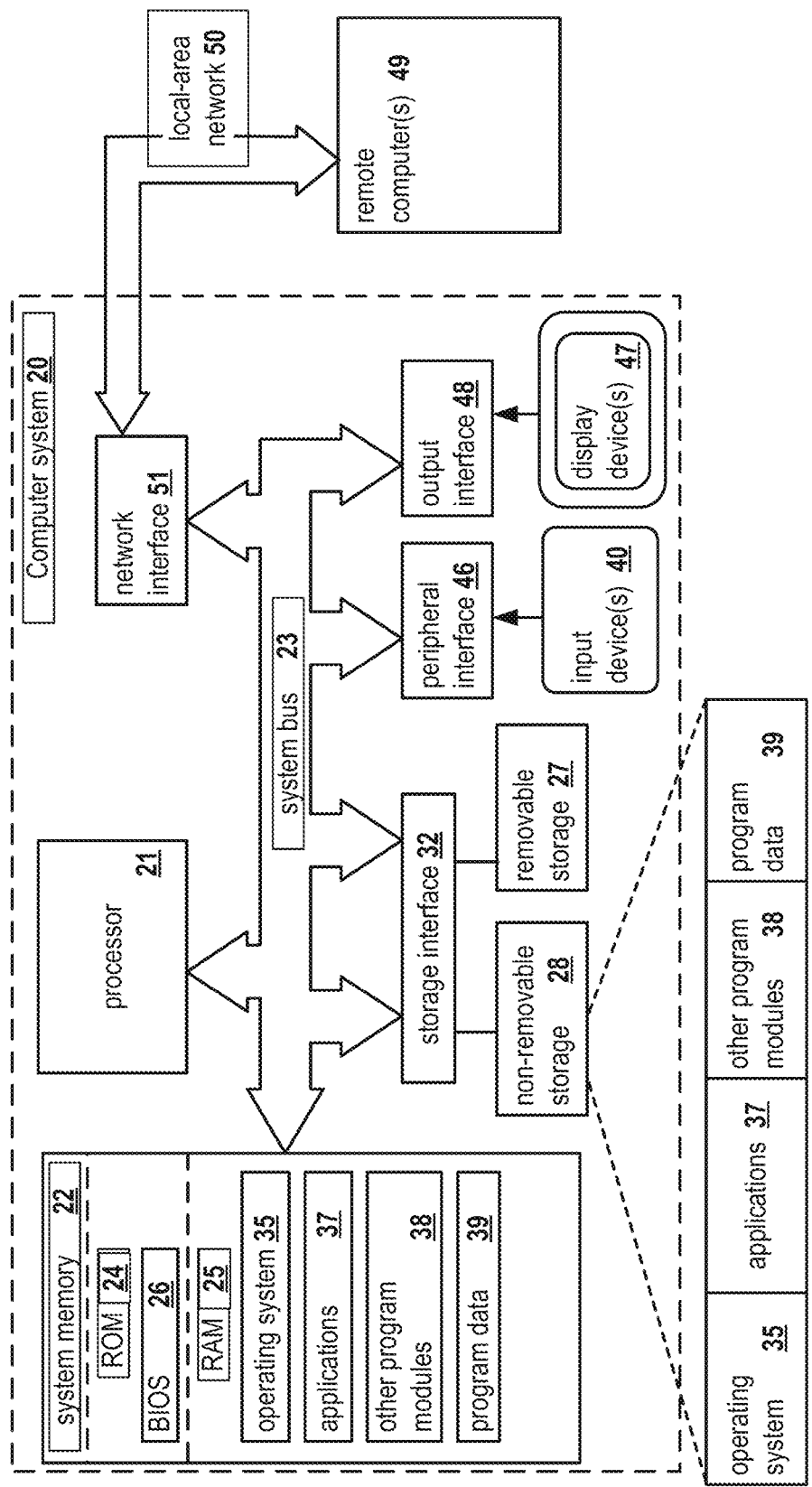
FIG. 4 presents an example of a general-purpose computer system on which aspects of the present disclosure can be implemented.

FIG. 4 is a block diagram illustrating a computer system 20 on which aspects of systems and methods for selecting client backup files for maliciousness analysis may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for selecting files for malware analysis, the method comprising:
    identifying, in a cloud network, a backup of a client machine;
    extracting, from the backup, at least one file of a given file type;
    determining whether to include the at least one file in a sandbox of the cloud network by performing a static analysis of the at least one file, wherein the static analysis comprises determining a likelihood of the at least one file being malicious and comparing the likelihood to a threshold likelihood;
    in response to determining that the likelihood exceeds the threshold likelihood, selecting the at least one file for inclusion in the sandbox, wherein the sandbox is a software environment that isolates the at least one file from other files in the backup;

monitoring, for a period of time, a behavior of the at least one file in the sandbox by performing a dynamic analysis of the at least one file, wherein the dynamic analysis comprises classifying a given file as malicious or non-malicious;

when determining that the at least one file is malicious based on the dynamic analysis, performing a remediation action on the at least one file; and when determining that the at least one file is not classified as malicious over the period of time based on the dynamic analysis, removing the at least one file from the sandbox.

2. The method of claim 1, wherein the remediation action comprises one or more of:

removing the at least one file from the backup;
quarantining the at least one file in the backup;
removing the at least one file from the client machine; and
quarantining the at least one file in the client machine and triggering a threat investigation process.

3. The method of claim 1, wherein the given file type is one of a script and an executable, wherein the threshold likelihood is different for each file type, and wherein the given file type is determined using one or more of magic numbers, file name extensions, rules, heuristics, and inferences of a trained machine learning algorithm.

4. The method of claim 1, wherein determining the likelihood of the at least one file being malicious comprises:

determining whether one or more rules of a plurality of rules indicate that the at least one file is malicious; and
calculating the likelihood based on a weight of the one or more rules.

5. The method of claim 4, wherein the plurality of rules query features present in the at least one file and classify whether the features are associated with potentially-malicious files, wherein the features include whether the at least one file was downloaded from a blacklisted website, whether the at least one file has been modified a threshold number of times in a small period of time, whether the at least one file has changed a system setting, and/or whether a hash value of the at least one file matches a known malware hash.

6. The method of claim 1, wherein determining the likelihood of the at least one file being malicious comprises:

executing a first machine learning algorithm configured to output a classification of whether the at least one file is to be included in the sandbox and a confidence score of the classification, wherein the confidence score is the likelihood, wherein the first machine learning algorithm is trained to make the classification based on features including operation codes (opcodes), byte sequences, Portable Executable (PE) header, and file size of input files.

7. The method of claim 1, wherein classifying the given file as malicious or non-malicious comprises executing a malware scanner that compares the at least one file to virus definitions.

8. The method of claim 1, wherein classifying the given file as malicious or non-malicious comprises executing a second machine learning algorithm configured to classify the at least one file as malicious or non-malicious, and wherein the second machine learning algorithm is trained based on a training dataset comprising features of labelled files in a plurality of sandboxes.

9. The method of claim 1, wherein in response to determining that the at least one file is not classified as malicious over the period of time based on the dynamic analysis, dissolving the sandbox.

10. The method of claim 1, further comprising generating a different sandbox for each backup in a backup archive, wherein the different sandbox is dissolved after a predetermined period of time.

11. The method of claim 1, wherein the threshold likelihood is adjusted based on an amount of resources in the cloud network.

12. The method of claim 1, wherein the sandbox includes files originating from backups of a plurality of client machines.

13. A system for selecting files for malware analysis, comprising:

a memory storing instructions; and
a hardware processor communicatively coupled with the memory and configured to execute the instructions to:
identify, in a cloud network, a backup of a client machine;
extract, from the backup, at least one file of a given file type;
determine whether to include the at least one file in a sandbox of the cloud network by performing a static analysis of the at least one file, wherein the static analysis comprises determining a likelihood of the at least one file being malicious and comparing the likelihood to a threshold likelihood;
in response to determining that the likelihood exceeds the threshold likelihood, select the at least one file for inclusion in the sandbox, wherein the sandbox is a software environment that isolates the at least one file from other files in the backup;
monitor, for a period of time, a behavior of the at least one file in the sandbox by performing a dynamic analysis of the at least one file, wherein the dynamic analysis comprises classifying a given file as malicious or non-malicious;
when determining that the at least one file is malicious based on the dynamic analysis, perform a remediation action on the at least one file; and
when determining that the at least one file is not classified as malicious over the period of time based on the dynamic analysis, remove the at least one file from the sandbox.

14. The system of claim 13, wherein the remediation action comprises one or more of:

removing the at least one file from the backup;
quarantining the at least one file in the backup;
removing the at least one file from the client machine; and
quarantining the at least one file in the client machine and triggering a threat investigation.

15. The system of claim 13, wherein the given file type is one of a script and an executable, wherein the threshold likelihood is different for each file type, and wherein the given file type is determined using one or more of magic numbers, file name extensions, rules, heuristics, and inferences of a trained machine learning algorithm.

16. The system of claim 13, wherein the hardware processor is configured to determine the likelihood of the at least one file being malicious by:

determining whether one or more rules of a plurality of rules indicate that the at least one file is malicious; and
calculating the likelihood based on a weight of the one or more rules.

17. The system of claim 16, wherein the plurality of rules query features present in the at least one file and classify whether the features are associated with potentially-malicious files, wherein the features include whether the at least one file was downloaded from a blacklisted website, whether the at least one file has been modified a threshold number of times in a small period of time, whether the at least one file has changed a system setting, and/or whether a hash value of the at least one file matches a known malware hash.

18. The system of claim 13, wherein the hardware processor is configured to determine the likelihood of the at least one file being malicious by:
executing a first machine learning algorithm configured to output a classification of whether the at least one file is to be included in the sandbox and a confidence score of the classification, wherein the confidence score is the likelihood, wherein the first machine learning algorithm is trained to make the classification based on features including operation codes (opcodes), byte sequences, Portable Executable (PE) header, and file size of input files.

19. A non-transitory computer readable medium storing thereon computer executable instructions for selecting files for malware analysis, the instructions, when executed comprise:
identifying, in a cloud network, a backup of a client machine;
extracting, from the backup, at least one file of a given file type;
determining whether to include the at least one file in a sandbox of the cloud network by performing a static analysis of the at least one file, wherein the static analysis comprises determining a likelihood of the at least one file being malicious and comparing the likelihood to a threshold likelihood;
in response to determining that the likelihood exceeds the threshold likelihood, selecting the at least one file for inclusion in the sandbox, wherein the sandbox is a software environment that isolates the at least one file from other files in the backup;
monitoring, for a period of time, a behavior of the at least one file in the sandbox by performing a dynamic analysis of the at least one file, wherein the dynamic analysis comprises classifying a given file as malicious or non-malicious;
when determining that the at least one file is malicious based on the dynamic analysis, performing a remediation action on the at least one file; and
when determining that the at least one file is not classified as malicious over the period of time based on the dynamic analysis, removing the at least one file from the sandbox.

* * * * *